United States Patent Office 3,535,361
Patented Oct. 20, 1970

3,535,361
PROCESS FOR THE PREPARATION OF N-HYDROXYIMIDOTHIOCARBOXYLIC ACID ESTERS
Bertram Anders, Cologne-Stammheim, and Hugo Malz, Leverkusen, Germany, assignors to Farbenfabriken Bayer Aktiengesellschaft, Leverkusen, Germany, a corporation of Germany
No Drawing. Filed Dec. 1, 1967, Ser. No. 687,150
Claims priority, application Germany, Dec. 17, 1966, F 50,994
Int. Cl. C07c 161/00, 131/00
U.S. Cl. 260—453                  10 Claims

ABSTRACT OF THE DISCLOSURE

Reacting an aldehyde in aqueous medium with about the stoichiometrical amount of hydroxylamine to form the corresponding aldehydoxime, acidifying to at most PH 1, e.g. with mineral acid, reacting the aldehydoxime with at most 2 equivalents of chlorine per mol thereof, e.g. at about —20 to +20° C., to form the corresponding chlorinated aldehydoxime, adding about half an equivalent of base, e.g. alkali or tertiary organic amine, per mol of chlorinated aldehydoxime, and reacting about a stoichiometrical amount of a mercapto compound (—SH) or alkali metal salt thereof with the chlorinated aldehydoxime, e.g. at about —20 to +20° C. and at a pH of at most 1, to split out HCl and form the corresponding N-hydroxyimidothiocarboxylic acid ester.

---

The present invention relates to and has for its objects the provision for particular new methods of producing certain known N-hydroxyimidothiocarboxylic acid esters, which are known intermediates for preparing auxiliaries for plastics and pesticides, e.g. in a simple reaction, using readily available starting materials whereby to attain outstanding yields, with other and further objects of the invention becoming apparent from a study of the within specification and accompanying examples.

N-hydroxyimidothiocarboxylic acid esters have hitherto been prepared by reaction of nitroalkanes and mercaptans, with the addition of alkali, upon heating for 15–20 hours (see U.S. Pat. No. 2,786,865) according to the following equation:

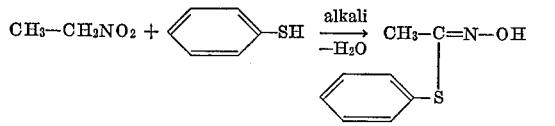

It has now been found in accordance with the present invention that a versatile and smooth process for the production of N-hydroxyimidothiocarboxylic acid esters in favorable yields and high purity may now be provided which comprises reacting an aldehyde of the formula

R—CHO in which R is selected from the group consisting of hydrogen, lower aliphatic and halolower aliphatic, in aqueous medium with about the stoichiometrical amount of hydroxylamine to produce the corresponding aldehydoxime having the formula R—CH=NOH in which R is the same as defined above, acidifying the resulting reaction mixture to a pH of at most 1 with mineral acid, introducing into such reaction mixture thereafter at most two equivalents of chlorine per mol of said aldehydoxime at a temperature within the range of substantially between about —20 to +20° C. to form the corresponding chlorinated aldehydoxime having the formula $$R-C=NOH$$
$$|$$
$$Cl$$

in which R is the same as defined above, adding to said reaction mixture about half an equivalent of a base per mol of said chlorinated aldehydoxime, and reacting said chlorinated aldehydoxime at a temperature within said range and at a pH of at most 1 with about the stoichiometrical amount of a mercapto compound having the formula $$R_1-SH$$

in which $R_1$ is selected from the group consisting of aliphatic having 1–12 carbon atoms, substituted aliphatic having 1–12 carbon atoms which is substituted with a member selected from the group consisting of carboethoxy and dilower alkylamino, cycloalkyl having 5–8 ring carbon atoms, phenyl lower alkyl, phenyllower alkyl which is substituted with at least one nuclear substituent selected from the group consisting of lower alkyl, halo and nitro, phenyl, naphthyl, and substituted phenyl which is substituted with 1–5 nuclear substituents selected from the group consisting of halo, lower alkyl and carbo-lower alkoxy, to split off hydrochloric acid and thereby form the corresponding N-hydroxyimidothiocarboxylic acid ester having the formula $$R-C=N-OH$$
$$|$$
$$R_1-S$$

in which R and $R_1$ are the same as defined above.

The ester may be isolated, optionally after previous adjustment to a pH of approximately 5 to 6 by addition of a base and cooling to approximately 0° C., by crystallization.

The production process of the present invention may be illustrated by the following example

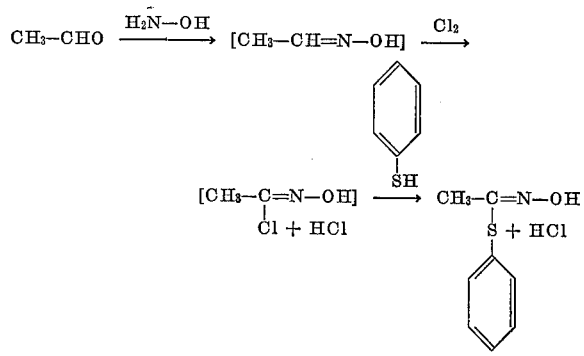

Advantageously, in contrast to the known process, the instant new process makes use of readily available starting materials. Furthermore, the instant reaction can in general be carried out in the absence of organic solvents. Moreover, elevated temperatures are not required. The N-hydroxyimidothiocarboxylic acid esters, by reason of their sparing solubility, crystallize in very pure form out of the salt-containing, aqueous reaction mixture at a pH value of approximately 5 to 6 and can be isolated in simple manner by filtering off with suction.

It must be regarded as particularly surprising that the reaction of the chlorinated aldehydoximes, which presumably occur as intermediates, can be carried out with free mercapto compounds at a pH not greater than 1 at relatively low temperatures with the splitting off of hydrochloric acid.

Examples of typical aldehydes which may be used in accordance with the process of the present invention include formaldehyde, acetaldehyde, propionaldehyde, butyraldehyde, isobutyraldehyde, chloroacetaldehyde, dichloroacetaldehyde, trichloroacetaldehyde, trifluoroacetaldehyde, and the like.

Examples of typical mercapto compounds which may be used in accordance with the process of the present invention include methyl, ethyl, butyl, dodecyl, allyl, but-2-ynyl, 2-(N,N-diethylamino) ethyl, carbethoxymethyl, cyclohexyl, phenylethyl, benzyl, 3,4-dichlorobenzyl, 4-methylbenzyl, 4-nitrobenzyl-mercaptan, thiophenol, pentachloro-thiophenol, 4-tert.-butylthiophenol, α- or β-thionaphthol, 4-mercaptobenzoic acid ethyl ester, and the like.

Examples of typical inorganic or mineral acids which may be used in accordance with the process of the present invention include sulfuric acid, phosphoric acid, nitric acid, and preferably, hydrochloric acid, and the like, in particular in the form of their aqueous solutions.

Examples of typical bases which may be used in accordance with the process of the present invention include the hydroxides, carbonates and hydrogen carbonates of the alkali metals (preferably sodium and potassium), of the alkaline earth metals (preferably calcium and barium) as well as of ammonia, and the like, preferably in the form of their aqueous solutions, i.e. all of which may be termed alkalis. There can also be used the tertiary organic amines customarily employed as bases, for example triethylamine, N,N'-diethylaniline, dimethylbenzylamine or pyridines, and the like, i.e. tertiary lower alkyl, phenyl, phenyl-substituted lower alkyl and mixed lower alkyl, phenyl and/or phenyl-substituted amines and pyridines.

In carrying out the process of the present invention, the appropriate oxime is first prepared in aqueous medium with 1 mol hydroxylamine. In any case, and especially where water-insoluble aldehydoximes are concerned, an inert organic solvent (for example, chlorinated aliphatic and chlorinated aromatic hydrocarbons such as methylene chloride, chloroform, carbon tetrachloride, chlorobenzene or other chlorinated hydrocarbon, e.g. chlorinated lower alkyl or phenyl hydrocarbon) may be added if desired. After acidification with a mineral acid to a pH not greater than 1, there are then introduced at approximately −20 to approximately +20° C., preferably −10 to +10° C., not more than 2 equivalents of chlorine; about half of the hydrochloric acid liberated is neutralized by addition of half an equivalent of a base and one mol of mercapto compound is then added while the solution is kept at most to a pH value=1. For the better handling of low-boiling mercaptans a solution of the mercaptide may also be added dropwise at a pH not greater than 1. Stirring is desirably effected for ½ to 3 hours, depending on the mercaptan used during which time the temperature can be increased to room temperature. According to the solubility of the N-hydroxyimidothiocarboxylic acid ester which is formed, the latter precipitates under the reaction conditions stated, optionally after addition of a base until a pH value of 5–6 is reached and cooling to about 0° C. In general, the reaction product can be filtered off in pure form, but it can also be taken up with an organic solvent and isolated in the usual manner.

The N-hydroxyimidothiocarboxylic acid esters obtainable according to the process of the invention can be used as intermediates for the preparation of auxiliaries for plastics and particularly for pesticides (Belgian Pat. 674,792).

The production process of the present invention is illustrated without limitation by the following examples:

EXAMPLE 1

280 g. (4 mols) of hydroxylamine hydrochloride were dissolved in 400 cc. of water, the hydroxylamine was liberated by addition of 165 g. of caustic soda in 240 cc. of water, and 176 g. (4 mols) of acetaldehyde were added dropwise, below 20° C., to the solution. Then, after the slightly exothermic reaction had subsided, the mixture was stirred for a further hour at 30–40° C., then cooled to 0–5° C. with ice and brought to a pH not greater than 1 by addition of concentrated hydrochloric acid (36% by weight). Into the solution so obtained there was introduced in about 1.5 hours, at 0–5° C., 280 g. (8 gramatoms) of chlorine, and a part of the liberated hydrochloric acid was then neutralized by addition of 80 g. of caustic soda in 120 cc. of water. At a pH less than 1, a solution of 280 g. (4 mols) of sodiummethylmercaptide in 1.2 liters of water, was then added dropwise within one hour. The temperature could have been increased to about 10° C. during this time. Stirring was continued for a further ½ hour; cooling to 0.5° C. was effected followed by neutralization of the remainder of the liberated hydrochloric acid by addition of a dilute solution of sodium hydroxide until a pH of 5 was reached. The N-hydroxyimidothioacetic methyl ester of the formula

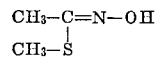

crystallized out and was separated by filtration from the aqueous solution. M.P.: 90–92° C., yield 278 g. (after washing with petroleum ether).

EXAMPLE 2

To a solution of 35 g. (0.5 mol) of hydroxylamine hydrochloride in 60 cc. of water there were added dropwise, below 15° C., first 21 g. of caustic soda in 30 cc. of water, and then 22 g. (0.5 mol) of acetaldehyde. Stirring was then continued at 40° C. (about 1 hour), the solution was adjusted to a pH less than 1 by addition of concentrated hydrochloric acid, and 35 g. of chlorine were introduced at 0–5° C. Stirring was then effected for about 1 hour at 0–5° C., half of the liberated hydrochloric acid was neutralized by adding a solution of 10 g. of caustic soda in 20 cc. of water, and 31 g. (0.5 mol) of ethylmercaptan were added. 20 g. of caustic soda in 35 cc. of water were then added dropwise at 0–5° C. in such a manner that the pH value remained below 1. Stirring was then continued for 30 minutes at 5–10° C., followed by cooling to 0° C. and the addition of a solution of sodium hydroxide until a pH value of 5–6 was reached. The N-hydroxyimidothioacetic acid ethyl ester of the formula

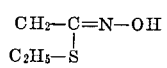

crystallized out and was isolated by filtration. Yield: 40 g.; M.P. 107–109° C. (after washing with cyclohexane).

In analogous manner, there were also obtained:

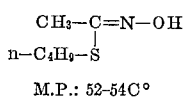  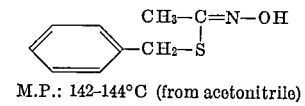

M.P.: 52–54C°        M.P.: 142–144°C (from acetonitrile)

EXAMPLE 3

An experiment was performed generally similar to that of Example 2 except that ethylmercaptan was not used. Instead, 72 g. of p-chlorothiophenol were dissolved in 150 cc. of methylene chloride and the solution was added dropwise to the aqueous mixture. Here too the reaction product could be separated in crystalline form from the two-phase system by filtration. Yield: 56 g. of the compound of the formula

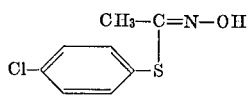

M.P.: 150–151° C. (decomposition).

In analogous manner there were also obtained:

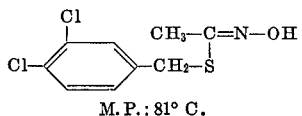

M.P.: 81° C.

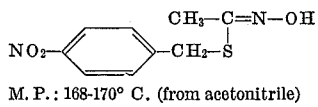

M.P.: 168-170° C. (from acetonitrile)

Advantageously, in accordance with the present invention, in the foregoing formulae:

R represents hydrogen; straight and branched lower aliphatic, especially having 1–5 carbon atoms and more especially lower alkyl such as methyl, ethyl, n- and isopropyl, n-, iso-, sec.- and tert.-butyl, amyl, and the like, particularly $C_{1-5}$ alkyl; halo-lower aliphatic such as fluoro, chloro, bromo and iodo, especially 1–3 fluoro, chloro and bromo, -substituted lower aliphatic, and particularly lower alkyl, of the foregoing type; and $R_1$ represents straight and branched $C_{1-12}$ aliphatic hydrocarbon, especially $C_{1-4}$ aliphatic, such as methyl, ethyl, n-propyl, isopropyl, n-butyl, isobutyl, sec.-butyl, tert.-butyl, amyl, hexyl, heptyl, octyl, nonyl, decyl, undecyl, dodecyl, and the like, especialy $C_{1-12}$ alkyl, more especially lower alkyl and particularly $C_{1-4}$; alkyl, vinyl, α-, β- and γ-allyl, propenyl, butenyl, pentenyl, hexenyl, heptenyl, octenyl, nonenyl, decenyl, undecenyl, dodecenyl, and the like, especially $C_{2-12}$ alkenyl, more especially lower alkenyl and particularly $C_{2-4}$ alkenyl; acetylenyl, propynyl, butynyl, dodecynyl, and the like, especially $C_{2-12}$ alkynyl, more especially lower alkynyl and particularly $C_{2-4}$ alkynyl; substituted straight and branched $C_{1-12}$ aliphatic, especially $C_{1-4}$ aliphatic of the foregoing type which is substituted with at least one of carboethoxy and di(lower) alkylamino, especially di-$C_{1-4}$ alkylamino; cycloalkyl such as cyclopentyl, cyclohexyl, cycloheptyl, cyclooctyl, and the like, especially $C_{5-8}$ cycloalkyl, more especially $C_{5-6}$ cycloalkyl and particularly cyclohexyl; phenyl lower alkyl, especially phenyl $C_{1-4}$ alkyl; substituted phenyl lower alkyl of the foregoing type which is substituted with 1–2 of lower alkyl, especially $C_{1-4}$ alkyl, halo such as fluoro, chloro, bromo and iodo, especially fluoro, chloro and bromo, and nitro; phenyl; naphthyl such as α- and β-naphthyl; and substituted phenyl which is substituted with 1–5 of halo such as fluoro, chloro, bromo and iodo, especially fluoro, chloro and bromo, lower alkyl, especially $C_{1-4}$ alkyl, and carbo-lower alkoxy or carboxylic acid-lower alkyl ester, especially carbo-$C_{1-6}$ alkoxy.

Preferably, R is lower alkyl and $R_1$ is lower alkyl, phenyl lower alkyl, chloro-substituted phenyl, chloro-substituted phenyl lower alkyl and nitro-substituted phenyl lower alkyl.

It will be appreciated that the instant specification and examples are set forth by way of illustration and not limitation, and that various modifications and changes may be made without departing from the spirit and scope of the present invention.

What is claimed is:

1. Process for the production of N-hydroxyimidothiocarboxylic acid esters which comprises reacting an aldehyde having the formula

R—CHO in which R is selected from the group consisting of hydrogen, lower alkyl and halolower alkyl, in aqueous medium with about the stoichiometrical amount of hydroxylamine to produce the corresponding aldehydoxime having the formula R—CH=NOH in which R is the same as defined above, acidifying the resulting reaction mixture to a pH of at most 1 with mineral acid, introducing into such reaction mixture thereafter at most two equivalents of chlorine per mole of said aldehydoxime at a temperature within the range of between about −20 to +20° C. to form the corresponding chlorinated aldehydoxime having the formula

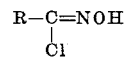

in which R is the same as defined above, adding to said reaction mixture about half an equivalent of a base per mol of said chlorinated aldehydoxime, and reacting said chlorinated aldehydoxime at a temperature within said range and at a pH of at most 1 with about the stoichiometrical amount of a mercapto compound having the formula $R_1$—SH in which $R_1$ is selected from the group consisting of aliphatic hydrocarbon having 1–12 carbon atoms, substituted aliphatic hydrocarbon having 1–12 carbon atoms which is substituted with a member selected from the group consisting of carboethoxy and dilower alkylamino, cyclo-alkyl having 5–8 ring carbon atoms, phenyl lower alkyl, phenyl-lower alkyl which is substituted with 1-2 nuclear substituents selected from the group consisting of lower alkyl, halo and nitro, phenyl, naphthyl, substituted phenyl which is substituted with 1-5 chloro substituents and substituted phenyl which is substituted with a substitutent selected from the group consisting of lower alkyl and carbo-lower alkoxy, to split off hydrochloric acid and thereby form the corresponding N-hydroxy-imidothiocarboxylic acid ester having the formula

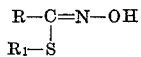

in which R and $R_1$ are the same as defined above.

2. Process according to claim 1 wherein the formed ester is isolated by adjusting the final reaction mixture to a pH substantially between about 5–6 and cooling to a temperature of about 0° C. to crystallize out such ester.

3. Process according to claim 1 wherein said mercapto compound is used in the form of its corresponding alkali metal salt.

4. Process according to claim 1 wherein the process is carried out in the presence of an inert organic solvent.

5. Process according to claim 1 wherein the process is carried out in the presence of an inert organic solvent selected from the group consisting of chlorinated aliphatic hydrocarbon and chlorinated aromatic hydrocarbon.

6. Process according to claim 1 wherein said mineral acid is selected from the group consisting of hydrochloric acid, sulfuric acid, nitric acid and phosphoric acid, and wherein said base is selected from the group consisting of hydroxides, carbonates and hydrogen carbonates of alkali metals, alkaline earth metals and ammonia, and tertiary organic amines.

7. Process according to claim 1 wherein said mineral acid is hydrochloric acid and said base is caustic soda.

8. Process according to claim 1 wherein said aldehyde is selected from the group consisting of formaldehyde, acetaldehyde, propionaldehyde, butyraldehyde, isobutyraldehyde, chloroacetaldehyde, dichloroacetaldehyde, trichloroacetaldehyde and trifluoroacetaldehyde, and wherein said mercapto compound is selected from the group consisting of methyl-, ethyl-, butyl-, dodecyl-, allyl-, but-2-ynyl-, 2-(N,N-diethylamino) ethyl-, carboethoxymethyl-, cyclohexyl-, phenylethyl-, benzyl-, 3,4-dichlorobenzyl-, 4-methylbenzl-, 4-nitrobenzylmercaptan, thiophenol, pentachlorothiophenol, 4-tert.-butylthiophenol, α- and β- thionaphthol, 4-mercaptobenzoic acid ethyl ester, and the corresponding alkali metal salts thereof.

9. Process according to claim 1 wherein R is lower alkyl and $R_1$ is selected from the group consisting of lower allkyl, phenyl lower alkyl, chloro-phenyl, mono and di chloro-phenyl lower alkyl and nitro phenyl lower alkyl.

10. Process according to claim 1 wherein R is selected from the group consisting of hydrogen, lower alkyl and halo-lower alkyl having 1-3 halo substituents and wherein $R_1$ is selected from the group consisting of $C_{1-12}$ alkyl; $C_{2-4}$ alkenyl; $C_{2-4}$ alkynyl; substituted lower alkyl which is substituted with a member selected from the group consisting of carboethoxy and di-lower alkylamino; $C_{5-6}$ cycloalkyl; phenyl lower alkyl; substituted phenyl lower alkyl which is substituted with 1-2 substituents selected from the group consisting of lower alkyl, halo and nitro; phenyl; naphthyl; substituted phenyl which is substituted with 1-5 chloro substituents; lower alkyl phenyl and carbo-lower alkoxy phenyl.

References Cited

UNITED STATES PATENTS

| 2,786,865 | 3/1957 | Copenhauer | 260—453 |
| 3,218,331 | 11/1965 | Eloy | 260—453 X |
| 3,374,260 | 3/1968 | Buchanan | 260—453 |

OTHER REFERENCES

Migrdichain, Organic Synthesis, vol. 1, pp. 151–153 (1957).

Wagner et al., Synthetic Organic Chemistry, pp. 787–788 (1965).

LEWIS GOTTS, Primary Examiner

DIANA G. RIVERS, Assistant Examiner

U.S. Cl. XR

260—566